United States Patent [19]

Kuehl et al.

[11] Patent Number: 4,861,570
[45] Date of Patent: Aug. 29, 1989

[54] NOVEL SILICATE

[75] Inventors: Guenter H. Kuehl, Cherry Hill; Michael E. Landis, Woodbury, both of N.J.

[73] Assignee: Mobil Oil Corporation, New York, N.Y.

[21] Appl. No.: 73,379

[22] Filed: Jul. 14, 1987

Related U.S. Application Data

[63] Continuation of Ser. No. 797,084, Nov. 12, 1985, abandoned.

[51] Int. Cl.⁴ .................. C01B 33/24; C01B 33/28
[52] U.S. Cl. .................................. 423/326; 423/328
[58] Field of Search ............. 423/326, 328, 329; 502/77

[56] References Cited

U.S. PATENT DOCUMENTS

| | | | |
|---|---|---|---|
| 4,481,174 | 11/1984 | Baacke et al. | 423/306 |
| 4,481,177 | 11/1984 | Valyocsik | 502/77 |
| 4,482,531 | 11/1984 | Kuehl | 423/329 |
| 4,578,258 | 3/1986 | Rieck | 423/325 |
| 4,581,213 | 4/1986 | Rieck | 423/325 |
| 4,582,693 | 4/1986 | Desmond et al. | 423/329 |
| 4,600,503 | 7/1986 | Angevine et al. | 208/251 H |
| 4,650,779 | 3/1987 | Goldstein | 502/38 |

OTHER PUBLICATIONS

Hans P. Eugster, "Hydrous Sodium Silicates from Lake Magadi Kenya, Precursors of Bedded Chert," *Science* vol. 157 5 Jul. 1967, pp. 1177-1180.
A. Araya et al; "Synthesis and Characterization of Zeolite Nu-10", *Zeolites*, vol. 4, Jul. 1984 pp. 280-286.

*Primary Examiner*—John Doll
*Assistant Examiner*—R. Bruce Breneman
*Attorney, Agent, or Firm*—Alexander J. McKillop; Charles J. Speciale; Edward F. Kenehan, Jr.

[57] ABSTRACT

A novel crystalline silicate has been prepared under hydrothermal conditions using as diquaternary ammonium salts derived by reaction of diazabicyclo [2.2.2] octane with $\alpha,\omega$-dibromoalkanes.

15 Claims, 5 Drawing Sheets

NOVEL SILICATE

This is a continuation of copending application Ser. No. 797,084, filed on Nov. 12, 1985 now abandoned.

FIELD OF THE INVENTION

This invention relates to a novel crystalline silicate and to its production.

BACKGROUND OF THE INVENTION

The fundamental unit of crystalline silicate structures is a tetrahedral complex consisting of the Si cation in a tetrahedral coordination with four oxygens. In some structures, the tetrahedra link to form chains which result in fibrous or needlelike morphologies. Single chains result when $SiO_4$ tetrahedra are joined at two oxygen atoms.

In other silicate structures, the tetrahedra are linked in layers or sheets as in mica minerals. Similar arrangement of the tetrahedra are found in clay minerals wherein two types of sheets may exist, one consisting of aluminum, iron or magnesium ions in a six-fold coordination with oxygens. The layer or sheet structures result from linking between three corners of each tetrahedron to neighboring tetrahedra. Breck, *Zeolite Molecular Sieves*, John Wiley & Sons, A Wiley Interscience, Publication New York, London, Sydney, Toronto, p. 31 (1974) reports that these layer or sheet structures do not have three-dimensional stability and may expand if the layers are forced apart by water, other molecules or ions, and thus, differ from silicates referred to as zeolites.

If the $SiO_4$ tetrahedra are linked in three dimensions by a mutual sharing of all of the oxygen atoms, a framework structure results. The family of zeolites embraces this characteristic and is characterized by the resulting three dimensional framework structure. One such zeolite is ZSM-12. That zeolite ZSM-12, its preparation and its distinctive X-ray diffraction pattern which identifies it and distinguishes it from other known crystalline silicates are taught by U.S. Pat. No. 3,832,449, the entire disclosure of which is incorporated herein by reference. U.S. Pat. No. 4,482,531, which is incorporated by reference herein in its entirety, describes the preparation of ZSM-12 from a reaction mixture containing sources of oxides of certain inorganics and containing adducts of diazabicyclo[2.2.2]octane and an $\alpha,\omega$-dihaloalkane.

SUMMARY OF THE INVENTION

The invention is directed to a novel silicate which is characterized by a unique X-ray diffraction pattern and to its preparation.

The novel silicate is prepared by crystallization from a reaction mixture containing a source of silicon oxide, optionally a source of aluminum oxide, an alkali hydroxide and an organic which is an adduct of diazabicyclo[2.2.2]octane (DABCO) and certain dihaloalkanes.

Figure 1:
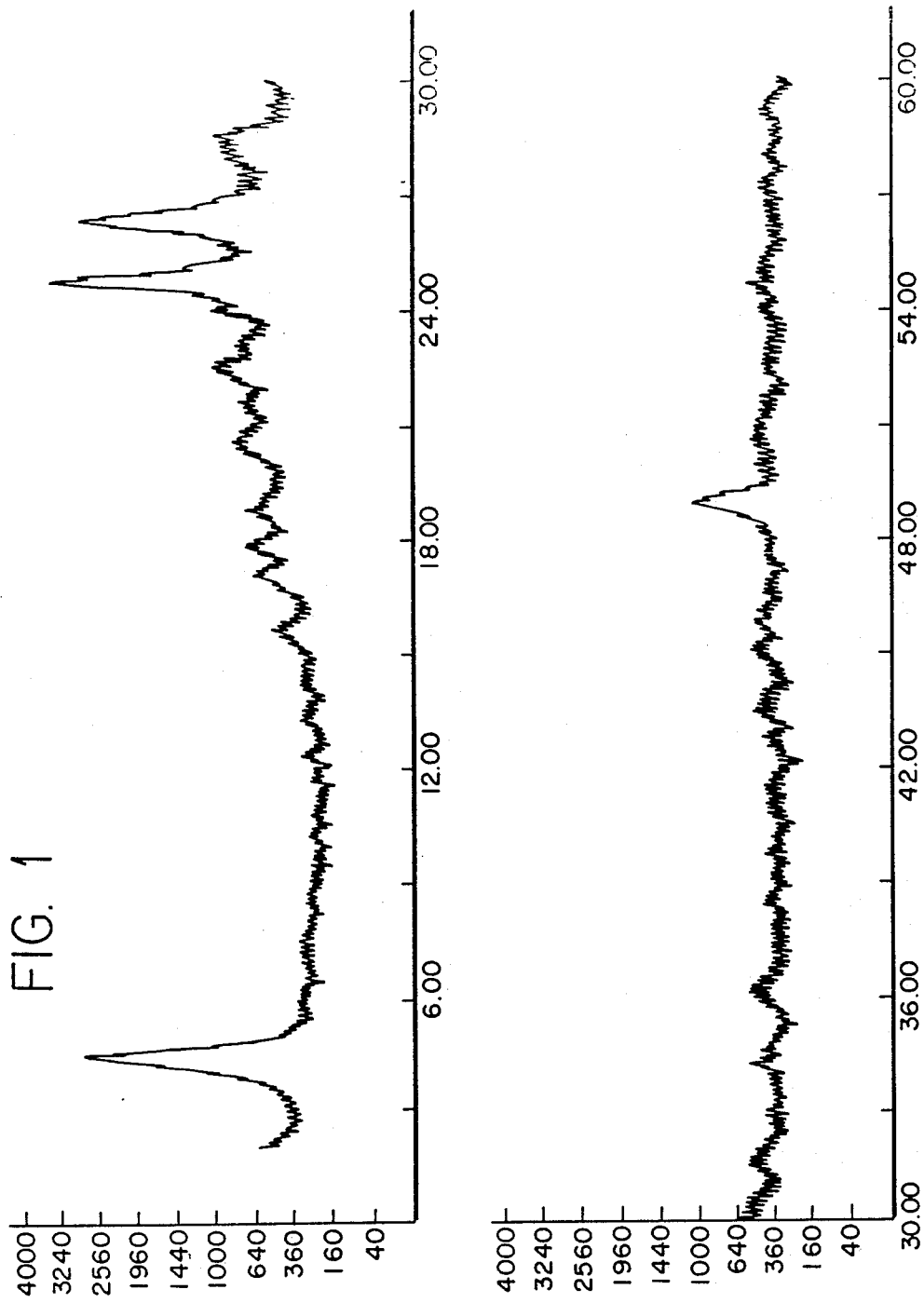
FIG. 1 is an X-ray diffraction trace of a sample of the as-synthesized product of Example 1.
Figure 2:
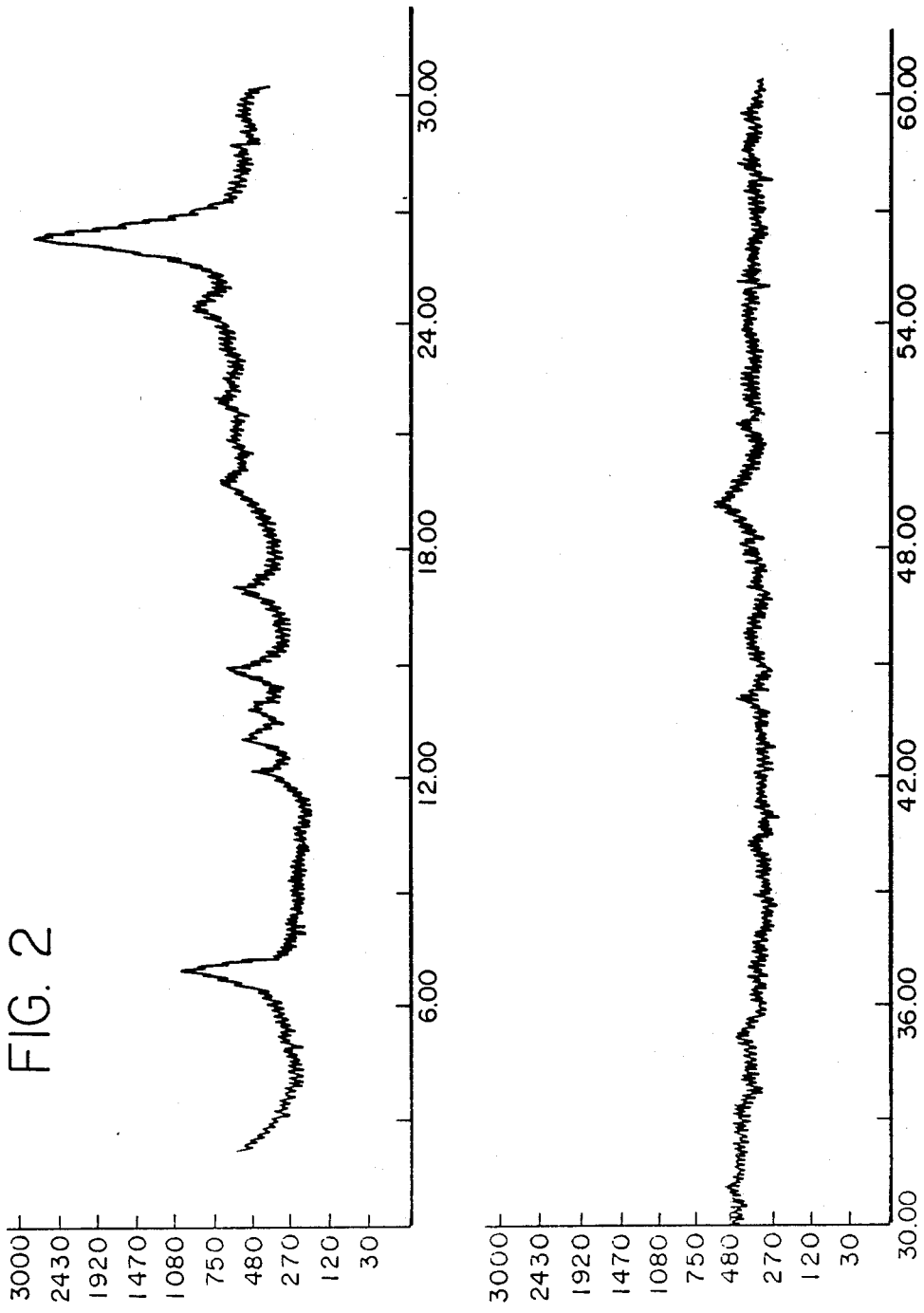
FIG. 2 is an X-ray diffraction trace of a sample of the product of Example 1 calcined at 538° C.

The scans of FIGS. 1-5 were derived with the use of the software "APD Peak Algorithm", as described below, and are computer generated plots of the square-root of the intensity v. $2\theta$ (the Bragg angle).

DETAILED DESCRIPTION OF THE INVENTION

The silicate prepared hereby can be identified in the as-crystallized form, in terms of mole ratios of oxides in the anhydrous state, as follows:

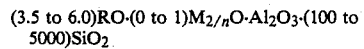

wherein M is at least one cation having a valence n and R, being divalent, is a cation derived from the diazabicyclo[2.2.2]octane adduct of an $\alpha,\omega$-dihaloalkane. The alumina content is less than about 2%. As will be seen below, calcination of the novel as-synthesized silicate produces a phase change which is reflected by X-ray powder diffraction pattern of the as-synthesized silicate compared to the X-ray pattern of the calcined silicate. This phase change suggests that the silicate is a layer silicate.

The new silicate was prepared by crystallization from a reaction mixture containing a source of silicon oxide, a source of aluminum oxide, an alkali hydroxide and an organic salt which is the adduct of the reaction between diazabicyclo[2.2.2]octane and $\alpha,\omega$-dihaloalkane; although the two halogen atoms of the $\alpha,\omega$-dihaloalkane may be fluorine, chlorine, bromine or iodine, preferably that compound is a $\alpha,\omega$-dibromoalkane.

More particularly, the organic salt is the product of the reaction of one molecule of $\alpha,\omega$-dihalo-n-alkane with two molecules of diazabicyclo[2.2.2]octane (DABCO) in which only one of each of the two DABCO nitrogen atoms is quaternized.

The products are of the formula

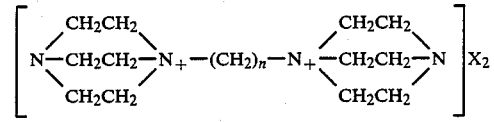

where $n=4$ or 5 and X is halogen, fluorine, chlorine, bromine, or iodine. The organic products are produced by reacting DABCO with the $\alpha,\omega$-dibromoalkane in a molar ratio of about 2:1, in a solvent therefor. Isolation of the resulting adduct may be by way of conventional extraction. The synthesis of the halogen salt of DABCO-$C_n$ diquat is conducted with constant stirring in methanol at the temperature of about 45°-55° C. in the manner described in detail by T. P. Abbiss and F. G. Mann in "Triethylenediamine (1,4-Diazabicyclo[2,2,-2]octane) and Hexaethylenetetramine. Part IV. The Interaction of Triethlyenediamine and Dibromomethane, 1,2-Dibromoethane, and 1,3-Dibromopropane," JOURNAL OF THE CHEMICAL SOCIETY, published by Chemical Society (London, 1964), pp 2248-2254, the entire contents of which are incorporated herein by reference. If desired, the halogen salt can be converted to the hydroxide form of the DABCO-$C_n$-diquat in any conventional manner.

The new silicate is crystallized from a reaction mixture containing sources of silicon oxide, of alkali metal oxide, the organic salt, water, and, optionally an oxide of aluminum and having a composition, in terms of mole ratios, within the following ranges:

|  | Broad | Preferred |
|---|---|---|
| $SiO_2/Al_2O_3$ | 100–∞ | 140–5000 |
| $H_2O/(RO + M_2O)$ | 50–250 | 80–150 |
| $OH^-/SiO_2$ | 0.05–0.50 | 0.1–0.40 |
| $RO/(RO + M_2O)$ | 0.30–0.90 | 0.40–0.80 | wherein R is the cationic form of the organic salt and M is an alkali metal ion. It is noted that the $SiO_2/Al_2O_3$ mole ratio for the reaction mixture of the present invention can vary over a wide range with an essentially unlimited upper end. It can be infinity or as reasonably close thereto as possible. The reaction mixture is maintained at crystallization conditions until the crystals of silicate are formed.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing the silicate can be supplied by one or more essential reactants and they can be mixed together in any order. For example, any oxide can be supplied as an aqueous solution, e.g., alkali ion as potassium or sodium hydroxide, or a suitable silicate, aluminate, or other salt. The directing agent compound (the organic salt) supplying an organic cation, may be in various forms, such as, for example, the hydroxide or a salt, e.g., halide, such as bromide.

The reaction mixture can be prepared either batchwise or continuously. Crystal size and crystallization time for the new silicate composition will vary with the exact nature of the reaction mixture employed. In general, the particle size of the silicate, as synthesized hereby, is 2 to 10 microns. Individual crystallites may vary from 0.1–2 microns in size.

Crystallization conditions include elevated temperatures broadly ranging from 120° C. to 225° C., preferably from 140° C. to 200° C.

Pressures during crystallization are the autogenous pressures. The pH of the reaction mixture will range from 13.5 to 10.0. Reaction times with resultant crystal formation will depend on temperature conditions and will broadly range from about 3 to about 25 days, but more preferably will range from about 5 to about 18 days.

Digestion of the reaction mixture is carried out until the crystallization is complete. The solid product is separated from the reaction medium by filtration, after cooling to room temperature.

The product dried at room temperature exhibits an X-ray diffraction pattern, the significant lines of which are listed in Table 1.

TABLE 1

| Significant X-ray Diffraction Lines of MCM-20 | | | |
|---|---|---|---|
| MCM-20A (Product of Examples 1 & 3) | | MCM-20B (Product of Example 7) | |
| d,Å | I | d,Å | I |
| 19.9 ± 0.5 | VS | 21.0 ± 4.0 | M–VS |
| 5.18 ± 0.1 | W | 5.09 ± 0.1 | W |
| 4.95 ± 0.1 | W | 4.85 ± 0.1 | W |
| 4.33 ± 0.08 | W | 4.48 ± 0.08 | W |
| 3.96 ± 0.08 | W–M | 3.95 ± 0.08 | W |
| 3.70 ± 0.07 | W–M | 3.70 ± 0.07 | W–M |
| 3.58 ± 0.07 | VS | 3.53 ± 0.07 | M—VS |
| 3.37 ± 0.07 | VS | 3.36 ± 0.07 | M–VS |
| 3.17 ± 0.06 | W | 3.20 ± 0.06 | M |
| 1.855 ± 0.02 | M | 1.85 ± 0.02 | M–S |

TABLE 2

| Significant X-ray Diffraction Lines of MCM-20 Calcined at 550° C. | | | |
|---|---|---|---|
| MCM-20A | | MCM-20B | |
| d,Å | I | d,Å | I |
| 13.1 ± 0.2 | W–M | 12.9 ± 0.2 | W–M |
| 7.40 ± 0.1 | W | 7.36 ± 0.1 | W |
| 6.88 ± 0.1 | W | 6.87 ± 0.1 | W |
| 6.49 ± 0.1 | W | ~6.4 | W |
| 6.05 ± 0.1 | W | ~6.0 | W |
| 5.30 ± 0.1 | W | | |
| 4.55 ± 0.08 | W | | |
| 4.09 ± 0.08 | W | | |
| 3.69 ± 0.07 | W | 3.76 ± 0.07 | W |
| 3.43 ± 0.07 | VS | 3.41 ± 0.07 | VS |
| 1.856 ± 0.02 | W | 1.857 ± 0.02 | W |

Figure 3:
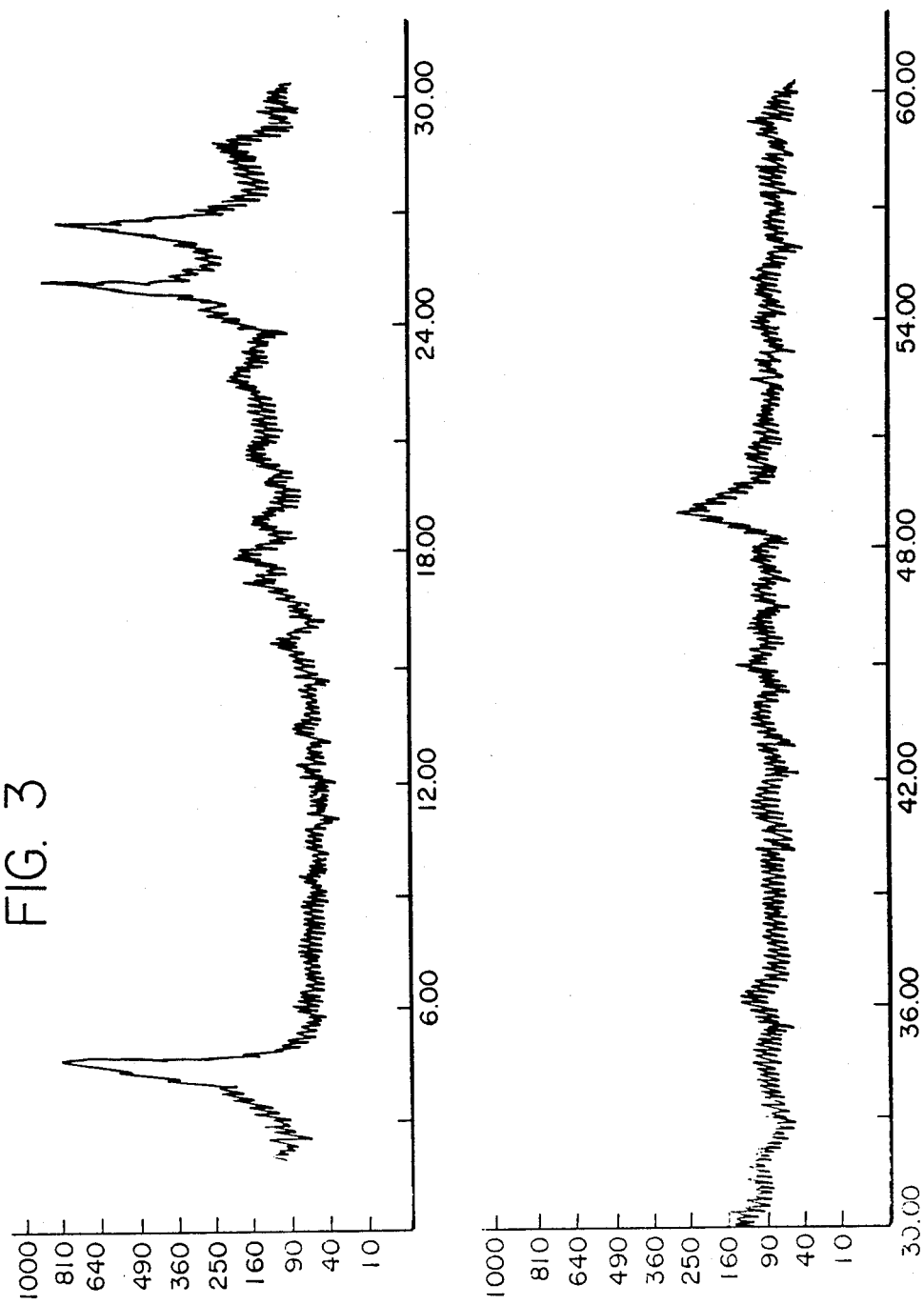
FIG. 3 is an X-ray diffraction race of a sample of the as-synthesized product of Example 3.
Figure 4:
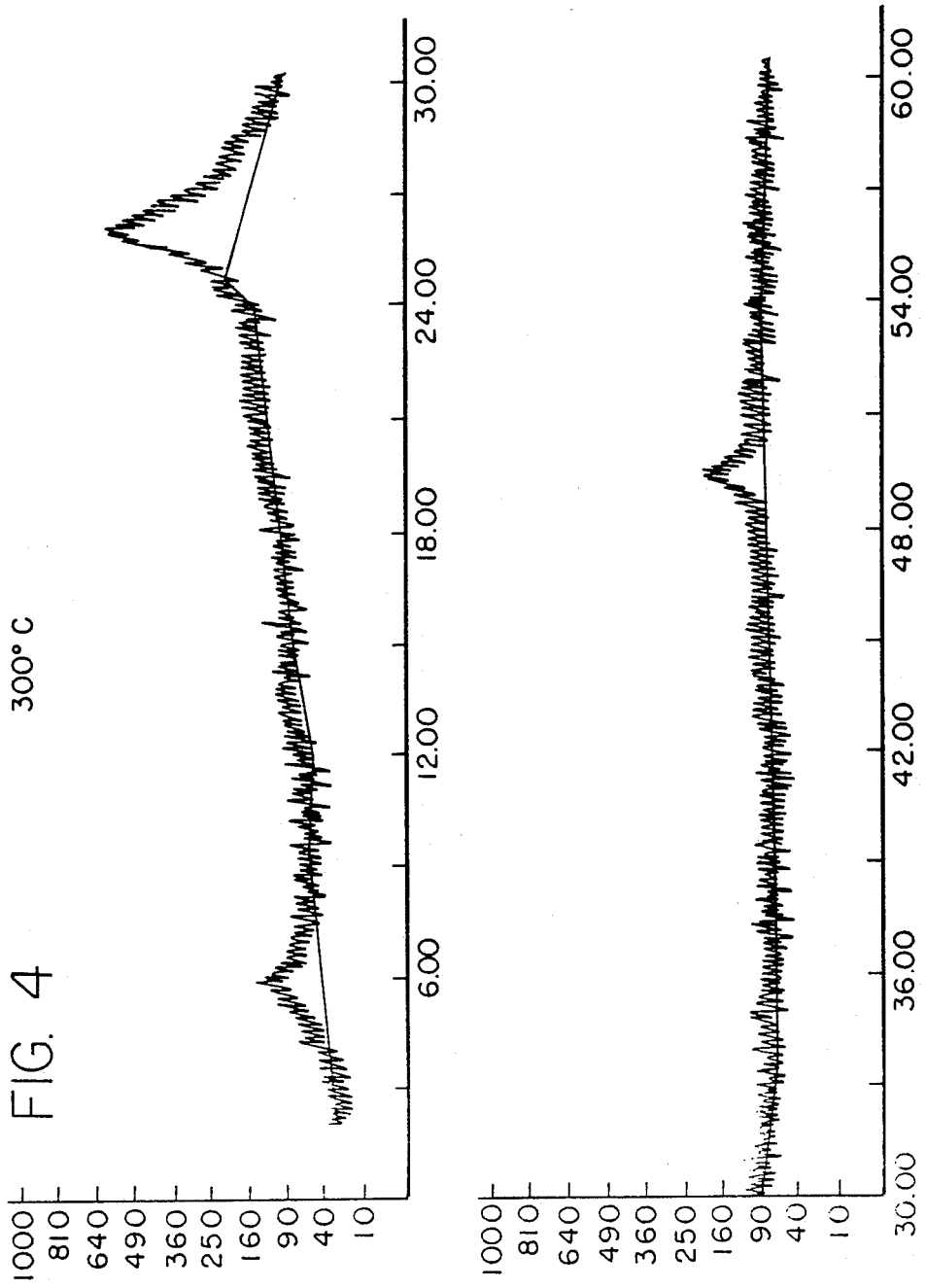
FIG. 4 is an X-ray diffraction trace of the product of Example 3 heated for 5 hours at 300° C.
Figure 5:
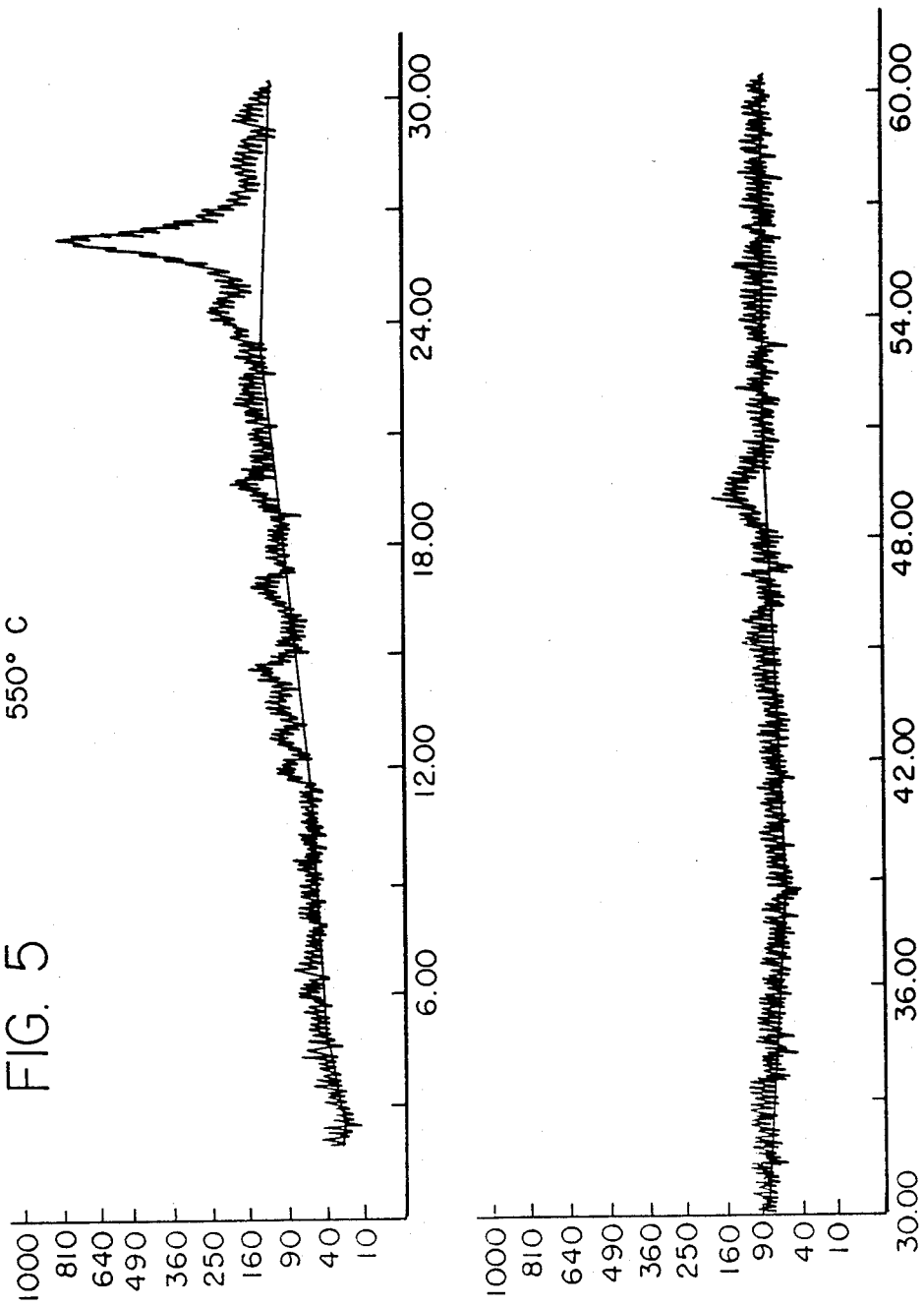
FIG. 5 is an X-ray diffraction trace of the Example 3 product calcined for 3 hours at 550° C.

The phase change on calcination is gradual and coincides with the loss of organic nitrogen compound, as demonstrated by the stepwise calcination of the product of Ex. 3 (see x-ray patterns of FIGS. 3–5). Of somewhat smaller crystallite size than the product of Ex. 1, it gave essentially the same x-ray diffraction pattern except for an additional low-angle shoulder of the 4.4° 2θ peak and an overall lower intensity of the pattern. The material contained slightly less nitrogen, 2.6%, than the product of Ex. 1, 2.99%. Upon heating at 300° C. for 5 hours, half of the nitrogen was lost and, besides other changes, the low-angle peak moved from 4.4° to 5.8° 2θ. Calcination for 3 hours at 550° C. removed essentially all of the nitrogen. The product gave an x-ray diffraction pattern that differed from that of the calcined product of Ex. 1 only in that the low-angle peak at 13.15 Å (6.72° 2θ) had a relative intensity of only 3.

These X-ray diffraction data were collected with the Philips APD-3600 X-ray system, using copper K-alpha radiation. The positions of the peaks, expressed in degrees 2 theta, where theta is the Bragg angle, were determined by step-scanning at 0.02 degrees of 2 theta intervals and a counting time of 2 seconds for each step. The interplanar spacings, d, measured in Angstrom units (Å), and the relative intensities of the lines, $I/I_o$, where $I_o$ is one hundredth of the intensity of the strongest line, including subtraction of the background, were derived with the use of the software "APD Peak Algorithm". The relative intensities are given in terms of the symbols vs=very strong, s=strong, m=medium and w=weak. The silicate compositions of the present invention may exhibit minor variations from the X-ray diffraction pattern in each of Tables 1 and 2, for example, some minor shifts in interplanar spacing and minor variation in relative intensity. Such minor variations can occur, depending on the silica to alumina ratio and the identity of cations present.

Calcination of the dried novel silicate results in decomposition of the organic cations and a phase change of the dried silicate structure. The phase change is gradual and coincides with loss of organic nitrogen compounds. This is borne out by the fact that the calcined silicate has a unique X-ray diffraction pattern different from that of the dried as-synthesized silicate. The X-ray diffraction pattern of the calcined form of the novel silicate is listed in Table 2. Calcination of the dried as-synthesized novel silicate is undertaken at temperatures effective to cause the phase change which coincides with loss of the organic nitrogen compounds. At temperatures used in the Examples, 300°–550° C., calcination was undertaken in an inert atmosphere at autogenous pressures. Lower temperatures, as well as higher temperatures of calcination may be employed. Calcination times are inversely related to calcination temperatures.

The as-synthesized precalcined silicate or its calcined product, prepared in accordance herewith, can have the original inorganic cations associated therewith replaced by a wide variety of other cations according to techniques well known in the art. It has not been established whether the organic cations can be removed efficiently from the as-synthesized form by ion-exchange. In any case, the silicate is expected to be more selective for the organic than for the replacing cation. Typical replacing cations include hydrogen, ammonium and metal cations including mixtures thereof. Of the replacing metallic cations, particular preference is given to cations of metals such as rare earths, Mn, Ca, Mg, Zn, Rh, Pd, Pt, Ni, Cu, Ti, Al, Sn, Fe and Co.

Typical ion exchange technique would be to contact the synthetic silicate with a salt of the desired replacing cation or cations. Although a wide variety of salts can be employed, particular preference is given to chlorides, nitrates, sulfates and acetates.

Representative ion exchange techniques are disclosed in a wide variety of patents including U.S. Pat. Nos. 3,140,249, 3,140,251 and 3,140,253.

Following contact with the salt solution of the desired replacing cation, the synthetic silicate is then preferably washed with water and dried at a temperature ranging from 65° C. to about 200° C. and thereafter may be calcined in air or an inert gas at temperatures ranging from about 200° C. to about 600° C. for periods of time ranging from 1 to 48 hours or more.

The novel silicate is distinct from known clay and zeolitic materials. Its high $SiO_2/Al_2O_3$ ratio should make it more hydrophobic than clay. The calcined material has a high surface area and exhibits hydrocarbon sorptive properties. These properties should make the new silicate more versatile than clay as a catalyst carrier. Its measured alpha value suggests its efficacy as a catalyst. Preliminary results indicate that the calcined form of the novel silicate exhibits activity for dodecane cracking, aromatization of methylcyclohexane, oligomerization or propylene and isomerization of trans-butene and xylene.

It may be desirable to use the new silicate in combination with a binder or matrix material resistant to the temperatures and other conditions employed in certain organic conversion processes. Conditions in hydrocarbon conversions can include pressures ranging from 1000–3000 psig, temperature ranging from 260°–482° C., LHSV from 0.1 to 5 and hydrogen gas flow rates of 1000 to 20,000 scf/bbl. Such matrix materials include active and inactive materials and synthetic or naturally occuring zeolites as well as inorganic materials such as clays, silica and/or metal oxides, e. g., alumina. The latter may be either naturally occuring or in the form of gelatinous precipitates, sols or gels including mixtures of silica and metal oxides. Use of a material in conjunction with the new silicate, i.e., combined therewith, which is active, may enhance the conversion and/or selectivity of a catalyst including the silicate in certain organic conversion processes. Inactive materials suitably serve as diluents to control the amount of conversion in a given process so that products can be obtained economically and orderly without employing other means for controlling the rate of reaction. Frequently, crystalline silicate materials have been incorporated into naturally occurring clays, e.g., bentonite and kaolin. These materials, i.e., clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized silicate include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the silicate hereby synthesized can be composited with a porous matrix material such as a silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 50 percent by weight of the composite.

In order to more fully illustrate the nature of the invention and the manner of practicing same, the following examples are presented. In the examples, whenever adsorption data are set forth for comparison of sorptive capacities for water, cyclohexane and n-hexane, they were determined as follows.

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the sorbant material, the decrease in pressure caused the monostat to open a valve which admitted more adsorbate vapor to the chamber to restore the above control pressures. Sorption was complete when the pressure change was not sufficient to activate the monostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica alumina cracking catalyst taken as an Alpha of 1 (Rate Constant=0.16 sec$^{-1}$). The Alpha Test is described in U.S. Pat. No. 3,354,078 and in *The Journal of Catalysis*, Vol. IV. pp. 522–529 (August 1965), each incorporated herein by reference as to that description. The silicate tested in this Alpha Test must be at least partially, in the hydrogen form. The conversion to the hydrogen form may be accomplished by contact of the silicate with an ammonium salt or acid solution followed by thermal treatment to eliminate ammonia and water from the silicate.

EXPERIMENTAL

Preparation of DABCO-C$_5$-diquat dibromide

DABCO, 80 g, was dissolved in 100 ml methanol and placed in a 1 liter round-bottom flask equipped with a magnetic stirring bar, reflux condenser, thermometer, and addition funnel. 1,5-Dibromopentane, 82.4 g, was added at such a rate to keep the reaction temperature at 50±5° C. After addition, the reaction mixture was stirred at room temperature for 2 hours. Then 300 ml of dry diethyl ether was added to separate the C$_5$-diquat as an oil from the solvents. The lower layer containing the product was separated from the upper layer. The solvent still present in the lower layer was evaporated by heating at 100° C. for 18 hours at 100 Torr.

Elemental analysis of the adduct revealed the following:

|  | % C | % N | C/N | % H |
|---|---|---|---|---|
| Actual | 43.7 | 11.95 | 4.25 | 7.81 |
| Theoretical* | 43.22 | 11.86 | 4.25 | 7.68 |

*Calculated on assumption that the adduct was a mono-hydrate

Preparation of DABCO-C$_4$-diquat dibromide 1,4-dibromobutane was used to prepare DABCO-C$_4$-diquat dibromide under substantially similar conditions and proportions as those used above to produce DABCO-C$_5$-diquat dibromide.

Elemental analysis of the adduct revealed the following

|  | % C | % N | C/N | % H |
|---|---|---|---|---|
| Actual | 42.8 | 12.46 | 4.01 | 7.07 |
| Theoretical* | 42.77 | 12.47 | 4.00 | 7.18 |

*Calculated on assumption that the adduct was DABCO—C$_4$-diquat.0.5 H$_2$O

EXAMPLE 1

Aluminum nitrate, Al(NO$_3$)$_3$·9H$_2$O, 0.8 g, was dissolved in 40 g of water. A solution of 10.55 g of DABCO-C$_5$-diquat dibromide in 50 g of water was added, followed by a solution of 4.0 g of potassium hydroxide (86.0% KOH) in 25 g of water. Finally, 24 g of Hi-Sil (~87 percent SiO$_2$) was blended into the composite solution. The reaction mixture so prepared was then digested at 160° C. in a Teflon-lined static autoclave for 17.5 days. The final pH was 10.1. The crystalline product was filtered, washed with water until bromide-free and then dried at ambient temperature. It gave an X-ray diffraction pattern whose major lines are listed in Table 3. After a three hour calcination at 538° C., the X-ray diffraction pattern contained the major lines listed in Table 4. The sorptive capacities were found to be (g/100 g of calcined solid).

| Cyclohexane, 200 Torr | 1.5 |
|---|---|
| n-Hexane, 20 Torr | 2.4 |
| Water, 12 Torr | 5.0 |
| Chemical composition of the dried sample, wt. percent | |
| SiO$_2$ | 73.0 |
| Al$_2$O$_3$ | 0.92 |
| K$_2$O | 1.06 |
| N | 2.99 |
| Ash | 76.0 |
| SiO$_2$/Al$_2$O$_3$ molar | 135 |

TABLE 3

X-Ray Diffraction Pattern of Product of Example 1

| 2 Theta | d,Å | I/I$_o$ |
|---|---|---|
| 4.45 | 19.8 | 73 |
| 15.55 | 5.70 | 6 |
| 16.73 | 5.30 | 6 |
| 17.15 | 5.17 | 11 |
| 17.81 | 4.98 | 14 |
| 18.77 | 4.73 | 12 |
| 20.52 | 4.33 | 16 |
| 21.49 | 4.14 | 14 |
| 22.43 | 3.96 | 23 |
| 23.16 | 3.84 | 14 |
| 24.00 | 3.71 | 22 |
| 24.88 | 3.58 | 100 |
| 26.48 | 3.37 | 81 |
| 28.12 | 3.17 | 17 |
| 28.61 | 3.12 | 18 |
| 30.23 | 2.957 | 8 |
| 31.68 | 2.825 | 5 |
| 34.14 | 2.627 | 3 |
| 34.68 | 2.587 | 3 |
| 36.24 | 2.479 | 5 |
| 43.65 | 2.074 | 3 |
| 45.12 | 2.010 | 4 |
| 45.96 | 1.975 | 3 |
| 49.12 | 1.855 | 20 |
| 50.81 | 1.797 | 3 |

TABLE 4

X-Ray Diffraction Pattern of Calcined Product of Example 1

| 2 Theta | d,Å | I/I$_o$ |
|---|---|---|
| 6.77 | 13.1 | 32 |
| 11.96 | 7.40 | 8 |
| 12.92 | 6.85 | 10 |
| 13.68 | 6.47 | 9 |
| 14.65 | 6.05 | 13 |
| 16.81 | 5.28 | 8 |
| 19.55 | 4.54 | 8 |
| 20.63 | 4.31 | 3 |
| 21.73 | 4.09 | 5 |
| 23.06 | 3.86 | 5 |
| 24.19 | 3.68 | 17 |
| 26.08 | 3.42 | 100 |
| 28.39 | 3.14 | 5 |
| 29.52 | 3.03 | 6 |
| 43.95 | 2.060 | 4 |
| 45.02 | 2.014 | 3 |
| 45.715 | 1.985 | 3 |
| 49.078 | 1.856 | 8 |

EXAMPLE 2

Five grams of the product of Example 1 were calcined for 3 hours at 538° C. in flowing nitrogen after being heated slowly to this temperature. After three hours at 538° C., the nitrogen was replaced with air in order to burn off any carbon deposited. The calcined product was exchanged three times with 45 ml of 0.2N ammonium acetate per gram of solid at 71° C. for 2 hours each in a sealed plastic jar. The product was filtered, washed with copious amounts of water and dried at ambient temperature. The dried material contained 0.01 percent of residual potassium. A sample of the ammonium-exchanged product was calcined for 3 hours at 538° C. Examination by X-ray diffraction showed the same pattern as given in Table 4. The product contained 1.16 wt. percent $Al_2O_3$ at 98.2 percent ash. It had an α-value of 0.5.

EXAMPLE 3

A reaction mixture identical to that of Example 1 was crystallized at 180° C. The product obtained after 163 hours gave essentially the same X-ray diffraction pattern as the product of Example 1.

EXAMPLE 4

The reaction mixture was identical to that of Example 1 except that the potassium hydroxide was replaced by 2.5 g of sodium hydroxide (~98 percent). The crystalline product obtained after 161 hours was identical to that of Example 1, but contained a minor amount of zeolite ZSM-12.

As pointed out above in the discussion of the "Background of the Invention", the DABCO adducts used herein can be used in the production of ZSM-12, as the major, or sole, crystalline product as described in U.S. Pat. No. 4,482,531. The parameters which control production of the new silicate, and thereby eliminate production of ZSM-12 or production of ZSM-12 in significant amounts have not been definitively delineated. The following observations concerning the experiments of Examples 1, 3 and 4 pertain to only one of many potential experimental variables, that of the $OH^-/SiO_2$ mole ratio, and are considered illustrative, rather than definitive, at this time.

The reaction mixtures of Examples 1, 3 and 4 had $OH^-/SiO_2$ molar ratios of 0.16. At higher $OH^-/SiO_2$ ratios of sodium containing reaction mixtures, the new silicate was obtained at short crystallization time (180 hours) at 160° C. Digestion at this temperature for about 300 hours yielded ZSM-12 as the main product.

EXAMPLE 5

This example contains no deliberately added aluminum source, but Hi-Sil contains about 0.5 percent $Al_2O_3$.

A quantity of 10.55 g of DABCO-$C_5$-diquat bromide was dissolved in 65 g of water. A solution of 3.8 g of sodium hydroxide (~98 percent) in 50 g of water was added, followed by 24 g of Hi-Sil. The well-blended reaction mixture was heated at 160° C. in a Teflon-lined autoclave. A crystalline product was isolated after 183 hours digestion at this temperature. The product had the X-ray diffraction pattern of the product of Example 1 and contained additionally a minor amount of ZSM-12. After calcination for 3 hours at 538° C. in air, the material had a surface area of 242 $m^2/g$ and the following sorptive capacities, g/100 of solid:

| | |
|---|---|
| Cyclohexane, 20 Torr | 3.2 |
| n-Hexane, 20 Torr | 2.8 |
| Water, 12 Torr | 4.5 |

The chemical composition of the dried sample was (wt. percent)

| | |
|---|---|
| $SiO_2$ (by difference) | 71.8 |
| $Al_2O_3$ | 0.47 |
| $Na_2O$ | 0.59 |
| N | 3.10 |
| Ash | 72.9 |
| $SiO_2/Al_2O_3$, molar | 260 |

EXAMPLE 6

The product of Example 5 was precalcined and ion-exchanged as described in Example 2. The dried material contained 0.2 percent residual sodium. The ammonium-exchanged product was calcined for 3 hours at 538 C. The X-ray diffraction pattern of this material was the same as listed in Table 2, but also contained a minor amount of ZSM-12. The calcined material contained 0.71 wt. percent of $Al_2O_3$ at 97.4 percent ash.

EXAMPLE 7

Aluminum nitrate, $Al(NO_3)_3 \cdot 9H_2O$, 0.8 g, was dissolved in 40 g of water. Solutions of 10.2 g of DABCO-$C_4$-diquat dibromide in 50 g of water and of 4.95 g of potassium hydroxide (86%) in 25 g of water were added. Finally, 24 g of Hi-Sil, a precipitated silica containing about 87% of $SiO_2$, was blended into the solution. The reaction mixture was heated at 180° C. in a teflon-lined static pressure vessel for 191 hours. The x-ray diffraction pattern of the product is given in Table 5.

TABLE 5

| X-Ray Diffraction Pattern of the Product of Example 7 | | |
|---|---|---|
| 2 Theta | d,Å | $I/I_o$ |
| 4.42 | 20.0 | 37 |
| 17.42 | 5.09 | 10 |
| 18.31 | 4.84 | 7 |
| 18.86 | 4.70 | 8 |
| 19.65 | 4.52 | 7 |
| 22.45 | 3.96 | 10 |
| 23.97 | 3.71 | 23 |
| 25.22 | 3.53 | 100 |
| 26.57 | 3.35 | 41 |
| 27.78 | 3.21 | 36 |
| 28.30 | 3.15 | 25 |
| 30.61 | 2.921 | 6 |
| 36.33 | 2.473 | 4 |
| 49.03 | 1.858 | 32 |
| 50.73 | 1.800 | 8 |

The calcined form of the product of Example 7 gave an x-ray diffraction pattern with the same lines as exhibited by calcined products of Examples 1 and 3, except for the lower apparent crystallinity, which does not permit separation of some of the weak lines. The low-angle peak of these calcined products can vary widely in intensity as a result of delamination and may even be absent in the extreme case.

EXAMPLE 8

Aluminum nitrate, $Al(NO_3)_3 \cdot 9H_2O$, 0.8 g, was dissolved in 40 g of water. Solutions of 10.2 g of DABCO-$C_4$-diquat dibromide in 50 g of water and of 3.1 g of sodium hydroxide (~98%) in 25 g of water were added.

Finally, 24 g of Hi-Sil, a precipitated silica containing about 87% $SiO_2$, was blended into the solution. The reaction mixture was then heated at 160° C. in a Teflon-lined static autoclave for 410 hours. The x-ray diffraction pattern of the product was similar to that of Example 7 (Table 5). After a 3-hour calcination at 538° C., the x-ray diffraction pattern was similar to that of the calcined product of Example 1 (Table 2), but indicating lower apparent crystallinity. The sorptive capacities were found to be, g/100 g of calcined solid:

| | |
|---|---|
| Cyclohexane, 20 Torr | 2.3 |
| n-Hexane, 20 Torr | 3.5 |
| Water, 12 Torr | 7.5 |

EXAMPLE 9

A quantity of 8 g of the product of Example 8 was calcined for 3 hours at 538° C. in flowing nitrogen. The nitrogen was then gradually replaced by air, and the calcination was continued until the carbon was burned off, allowing no more than 10° C. temperature rise.

The calcined material was ammonium exchanged in the same manner as described in Example 6. The product had the following composition (wt. %):

| | |
|---|---|
| $SiO_2$ | 86.42 |
| $Al_2O_3$ | 1.0 |
| Na | 0.01 |
| N | 0.36 |
| Ash | 87.72 |
| $SiO_2/Al_2O_3$, molar | 147 |

The product of Ex. 9 was sized 14–25 mesh and calcined. It gave an alpha value of 2.6 and a constraint index of 0.9 at 1000° F. In agreement with this result, the material showed modest activities for dodecane cracking, aromatization of methyl-cyclohexane, oligomerization of propylene and isomerization of trans-butene and xylene.

The new layered silicate was pillared in accordance with the invention described in the U.S. patent application, Ser. No. 797,276, filed Nov. 12, 1985.

What is claimed is:

1. A silicate or metallosilicate having an x-ray diffraction pattern as set forth in Table 1 of the specification.

2. The metallosilicate of claim 1 which contains aluminum in an amount of less than about 2 percent by weight.

3. The silicate or metallosilicate of claim 1, which exhibits, after calcination, an x-ray pattern as set forth in table 2.

4. The silicate or metallosilicate of claim 1, ion-exchanged to contain hydrogen ions, ammonium, cations of at least one metal selected from the group consisting of rare earth metals, manganese, calcium, magnesium, zinc, cerium, palladium, nickel, copper, titanium, aluminum, tin, iron and cobalt, or mixtures thereof.

5. The metalloxilicate of claim 2, ion-exchanged to contain hydrogen ions, ammonium, cations of at least one metal selected from the group consisting of rare earth metals, manganese, calcium, magnesium, zinc, cerium, palladium, nickel, copper, titanium, aluminum, tin, iron and cobalt, or mixtures thereof.

6. The metallosilicate of claim 3, ion-exchanged to contain hydrogen ions, ammonium, cations of at least one metal selected from the group consisting of rare earth metals, manganese, calcium, magnesium, zinc, cerium, palladium, nickel, copper, titanium, aluminum, tin, iron and cobalt, or mixtures thereof.

7. The silicate or metallosilicate of claim 1, which has a formula, expressed in terms of mole ratios of oxides in the anhydrous state, which is (3.5 to 6.0)RO·(0 to 1) $M_{2/m}O \cdot Al_2O_3 \cdot$ (100 to 5000) $SiO_2$ wherein R is

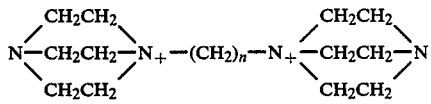

wherein n is 4 or 5 ; and M is alkali metal cation and m is 1.

8. The silicate or metallosilicate of claim 3, which before calcination has a formula, expressed in terms of mole ratios of oxides in the anhydrous state, which is (3.5 to 6.0) RO·(0 to 1) $M_{2/m} \cdot Al_2O_3 \cdot$ (100 to 5000) $SiO_2$ wherein R is

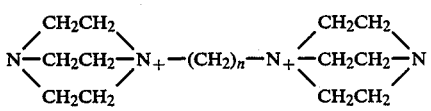

wherein n is 4 or 5; and M is alkali metal cation and m is 1.

9. A silicate or metallosilicate having an x-ray diffraction pattern as set forth in Table 2 of the specification.

10. The silicate or metallosilicate of claim 9 which contains aluminum in an amount of less than about 2 percent by weight.

11. The silicate or metallosilicate of claim 9, ion-exchanged to contain hydrogen ions, ammonium, cations of at least one metal selected from the group consisting of rare earth metals, manganese, calcium, magnesium, zinc, cerium, palladium, nickel, copper,titanium, aluminium, tin, iron and cobalt, or mixtures thereof.

12. The silicate or metallosilicate of claim 10, ion-exchanged to contain protons,ammonium, cations of at least one metal selected from the group consisting of manganese, calcium magnesium, zinc, cerium, palladium, nickel, copper, titanium, aluminum, tin, iron and cobalt, or mixtures thereof.

13. A catalyst composition comprising the silicate or metallosilicate of claim 1.

14. A catalyst composition comprising the silicate or metallosilicate of claim 9.

15. A silicate or metallosilicate having the x-ray diffraction pattern of FIG. 1.

* * * * *